United States Patent
Bang et al.

(10) Patent No.: US 11,136,028 B2
(45) Date of Patent: Oct. 5, 2021

(54) SPEED CONTROLLER FOR PLATOONING VEHICLE AND METHOD THEREFOR

(71) Applicants: Hyundai Motor Company, Seoul (KR); Kia Motors Corporation, Seoul (KR)

(72) Inventors: Kyung Joo Bang, Seoul (KR); Hong Gi Park, Seoul (KR); Sang Yeob Lee, Seongnam-si (KR); Il Hwan Kim, Hwaseong-si (KR); Seung Hyun Kim, Seoul (KR); Dong Hyuk Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 245 days.

(21) Appl. No.: 16/597,758

(22) Filed: Oct. 9, 2019

(65) Prior Publication Data

US 2020/0384995 A1    Dec. 10, 2020

(30) Foreign Application Priority Data

Jun. 7, 2019    (KR) .................. 10-2019-0067228

(51) Int. Cl.
| | |
|---|---|
| *G05D 1/00* | (2006.01) |
| *B60W 50/00* | (2006.01) |
| *B60W 30/16* | (2020.01) |
| *G05D 1/02* | (2020.01) |
| *B60W 30/18* | (2012.01) |

(52) U.S. Cl.
CPC ...... *B60W 30/16* (2013.01); *B60W 30/18072* (2013.01); *B60W 50/0097* (2013.01); *G05D 1/0291* (2013.01); *B60W 2520/105* (2013.01); *B60W 2540/10* (2013.01); *B60W 2540/12* (2013.01); *B60W 2554/804* (2020.02); *B60W 2555/60* (2020.02); *B60W 2720/106* (2013.01)

(58) Field of Classification Search
None
See application file for complete search history.

(56) References Cited

U.S. PATENT DOCUMENTS

| | | | |
|---|---|---|---|
| 9,539,989 B2 | 1/2017 | Yamashiro | |
| 2010/0299044 A1* | 11/2010 | Miyake | B62K 11/007 701/96 |
| 2013/0041567 A1 | 2/2013 | Yamashiro | |
| 2013/0116861 A1* | 5/2013 | Nemoto | B60W 30/16 701/2 |
| 2013/0124064 A1* | 5/2013 | Nemoto | B60W 30/16 701/96 |

(Continued)

FOREIGN PATENT DOCUMENTS

JP    2013-037621 A    2/2013

*Primary Examiner* — James M McPherson
(74) *Attorney, Agent, or Firm* — Morgan, Lewis & Bockius LLP (57) ABSTRACT

A speed controller for a leading vehicle includes: a communication device that receives a target acceleration and a current acceleration from a following vehicle; and a controller that predicts a time when the following vehicle brakes based on the received target acceleration and the received current acceleration when the leading vehicle coasts down, and increases a speed of the leading vehicle at the predicted time.

20 Claims, 5 Drawing Sheets

(56) References Cited

U.S. PATENT DOCUMENTS

| | | | | |
|---|---|---|---|---|
| 2014/0005906 | A1* | 1/2014 | Pandita | B60W 40/04 |
| | | | | 701/96 |
| 2017/0369055 | A1* | 12/2017 | Saigusa | G08G 1/0116 |
| 2018/0126931 | A1* | 5/2018 | Derag Rden et al. | |
| | | | | B60R 16/0233 |
| 2019/0093581 | A1* | 3/2019 | Vadlamani | B60W 40/13 |
| 2019/0129440 | A1* | 5/2019 | Borhan | G05D 1/0088 |
| 2019/0389487 | A1* | 12/2019 | Gowda | B60Q 1/503 |
| 2020/0307600 | A1* | 10/2020 | Sato | B60W 50/029 |

* cited by examiner

SPEED CONTROLLER FOR PLATOONING VEHICLE AND METHOD THEREFOR

CROSS-REFERENCE TO RELATED APPLICATION

This application is claims the benefit of priority to Korean Patent Application No. 10-2019-0067228, filed in the Korean Intellectual Property Office on Jun. 7, 2019, the entire contents of which are incorporated herein by reference.

TECHNICAL FIELD

The present disclosure relates to technologies of controlling a speed of a leading vehicle when platooning vehicles coasts down.

BACKGROUND

Platooning is when several vehicles move together while maintaining a minimum safety distance therebetween. When such platooning is performed, the air resistance of following vehicles is reduced to enhance fuel efficiency and the risk of an accident is reduced. Furthermore, convenience for a driver of each vehicle may be enhanced, and the number of vehicles which use the road may be increased 3 to 5 times because an interval between vehicles is reduced.

Recently, technologies which facilitate the platooning of respective vehicles in the state where a driver does not ride in a leading vehicle and where drivers do not ride in following vehicles which follow the leading vehicle have been developed.

Each of following vehicles which follow a leading vehicle in the platooning of an autonomous driving mode measures acceleration of a preceding vehicle which is traveling in immediately front of it using it's radar sensor, transmits and receives driving information and control information with the preceding vehicle thorough vehicle-to-vehicle (V2V) communication, performs acceleration or deceleration based on the obtained various information of the preceding vehicle, and maintains a separation distance from the preceding vehicle.

In an existing technology which controls speeds of platooning vehicles, when a leading vehicle and a following vehicle coast down, as a speed of the following vehicle is increased by a grade of the road, performance of the vehicle, a load of the vehicle, and the like, so that a separation distance from the leading vehicle is within a reference distance, the following vehicle brakes to match the separation distance from the leading vehicle to the reference distance.

As a result, as a speed where the following vehicle coasts down is quicker than a speed where the leading vehicle coasts down, when the separation distance from the leading vehicle becomes reduced to less than the reference distance, a plurality of following vehicles brake to prevent a collision with the leading vehicle, thus degrading the fuel efficiency of the plurality of following vehicles.

SUMMARY

The present disclosure has been made to solve the above-mentioned problems occurring in the prior art while advantages achieved by the prior art are maintained intact.

An aspect of the present disclosure provides a speed controller for a platooning vehicle for operating a power unit of a leading vehicle to increase a speed of the leading vehicle, when braking is required due to an increase in a speed of a following vehicle when the platooning vehicle coasts down, to prevent the following vehicle from unnecessarily braking and enhance platooning fuel efficiency and a method therefor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus may include: a communication device that receives a target acceleration and a current acceleration from a following vehicle and a controller that predicts a time when the following vehicle brakes, based on the received target acceleration and the received current acceleration, when a leading vehicle coasts down, and increases a speed of the leading vehicle at the predicted time.

The controller may predict a time when the target acceleration of the following vehicle is less than the current acceleration of the following vehicle as the time when the following vehicle brakes.

The speed controller may further include a sensor group that measures an accelerator position sensor (APS) value and a brake position sensor (BPS) value. The controller may determine that the leading vehicle coasts down, when the APS value is zero and when the BPS value is zero.

The controller may determine that the leading vehicle coasts down, when a torque command value of a power unit of the leading vehicle, the torque command value being obtained over a vehicle network, is zero and when a braking command value is zero.

The controller may increase a speed of the leading vehicle within a reference range, when a preceding vehicle which is traveling on a same lane as the leading vehicle is spaced from the leading vehicle at a certain distance or when a speed of the preceding vehicle is greater than a reference value compared with the speed of the leading vehicle, in a state where a current speed of the leading vehicle is slower than a speed limit of a road.

According to another aspect of the present disclosure, a method may include: receiving a target acceleration and a current acceleration from a following vehicle, predicting a time when the following vehicle brakes, based on the received target acceleration and the received current acceleration, when a leading vehicle coasts down, and increasing a speed of the leading vehicle at the predicted time.

The predicting of the time when the following vehicle brakes may include predicting a time when the target acceleration of the following vehicle is less than the current acceleration of the following vehicle as the time when the following vehicle brakes.

The method may further include obtaining an accelerator position sensor (APS) value and a brake position sensor (BPS) value. The predicting of the time when the following vehicle brakes may include determining that the leading vehicle coasts down, when the APS value is zero and when the BPS value is zero.

The predicting of the time when the following vehicle brakes may include determining that the leading vehicle coasts down, when a torque command value of a power unit of the leading vehicle, the torque command value being obtained over a vehicle network, is zero and when a braking command value is zero.

The increasing of the speed of the leading vehicle may include increasing a speed of the leading vehicle within a reference range, when a preceding vehicle which is traveling on a same lane as the leading vehicle is spaced from the leading vehicle at a certain distance or when a speed of the preceding vehicle is greater than a reference value compared with the speed of the leading vehicle, in a state where a current speed of the leading vehicle is slower than a speed limit of a road.

According to another aspect of the present disclosure, an apparatus may include: a communication device that receives information about a braking time from a following vehicle and a controller that determines a time when the following vehicle brakes, based on the received information about the braking time, when a leading vehicle coasts down, and increases a speed of the leading vehicle at the determined time.

The speed controller may further include a sensor group that measures an accelerator position sensor (APS) value and a brake position sensor (BPS) value. The controller may determine that the leading vehicle coasts down, when the APS value is zero and when the BPS value is zero.

The controller may determine that the leading vehicle coasts down, when a torque command value of a power unit of the leading vehicle, the torque command value being obtained over a vehicle network, is zero and when a braking command value is zero.

The controller may increase a speed of the leading vehicle within a reference range, when a preceding vehicle which is traveling on a same lane as the leading vehicle is spaced from the leading vehicle at a certain distance or when a speed of the preceding vehicle is greater than a reference value compared with the speed of the leading vehicle, in a state where a current speed of the leading vehicle is slower than a speed limit of a road.

According to another aspect of the present disclosure, a method may include: receiving information about a braking time from a following vehicle, determining a time when the following vehicle brakes, based on the received information about the braking time, when a leading vehicle coasts down, and increasing a speed of the leading vehicle at the determined time.

The determining of the time when the following vehicle brakes may include determining that the leading vehicle coasts down, when the APS value is zero and when the BPS value is zero.

The determining of the time when the following vehicle brakes may include determining that the leading vehicle coasts down, when a torque command value of a power unit of the leading vehicle, the torque command value being obtained over a vehicle network, is zero and when a braking command value is zero.

The increasing of the speed of the leading vehicle may include increasing a speed of the leading vehicle within a reference range, when a preceding vehicle which is traveling on a same lane as the leading vehicle is spaced from the leading vehicle at a certain distance or when a speed of the preceding vehicle is greater than a reference value compared with the speed of the leading vehicle, in a state where a current speed of the leading vehicle is slower than a speed limit of a road.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In an exemplary embodiment of the present disclosure, coast down may refer to driving in a state where an accelerator and a brake of a vehicle are not operated, and a braking time may refer to a time immediately before real braking is performed.

Figure 1:
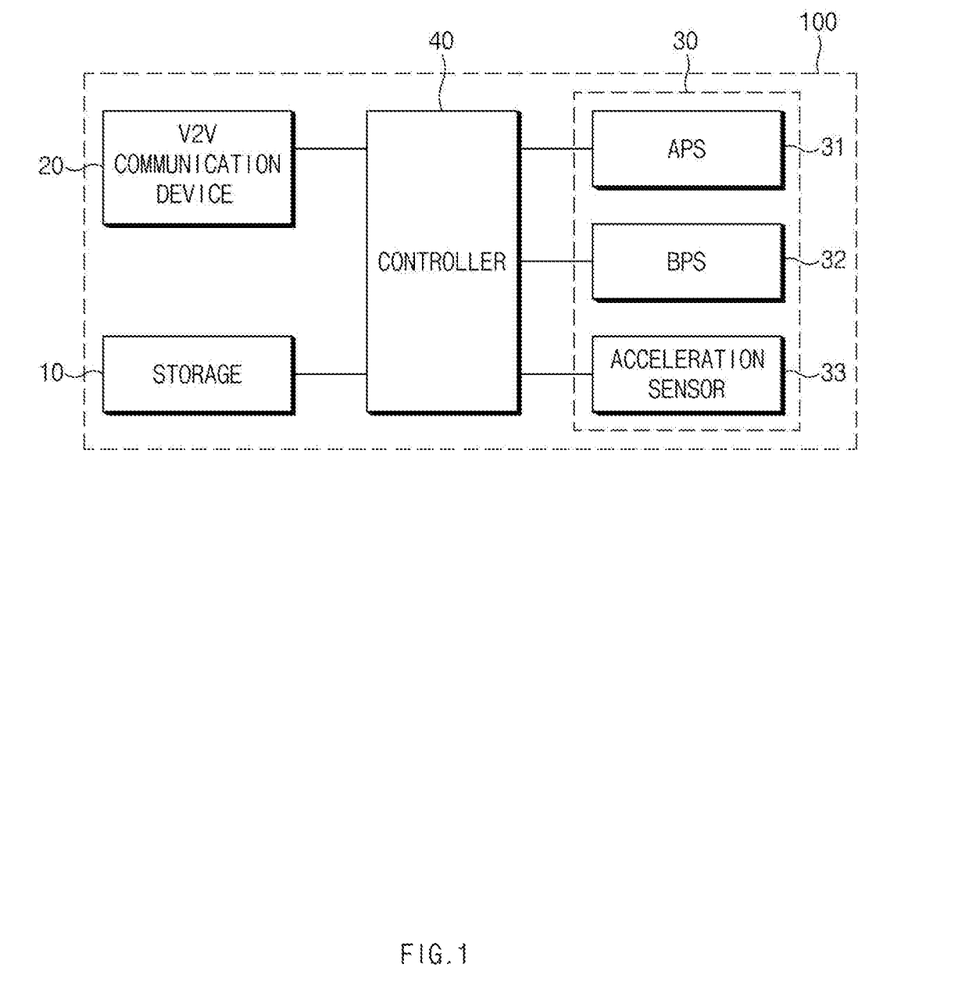
FIG. 1 is a block diagram illustrating a configuration of a speed controller for a platooning vehicle according to an exemplary embodiment of the present disclosure.

FIG. 1 is a block diagram illustrating a configuration of a speed controller for a platooning vehicle according to an exemplary embodiment of the present disclosure. The speed controller may be loaded into a following vehicle as well as a leading vehicle. However, hereinafter, a description will be given of an example in which the speed controller is loaded into the leading vehicle.

As shown in FIG. 1, a speed controller 100 for a platooning vehicle may include a storage 10, a vehicle-to-vehicle (V2V) communication device 20, a sensor group 30, and controller 40. The respective components may be combined with each other to form one component and some components may be omitted, depending on a manner which executes the speed controller 100 according to an exemplary embodiment of the present disclosure.

Figure 2:
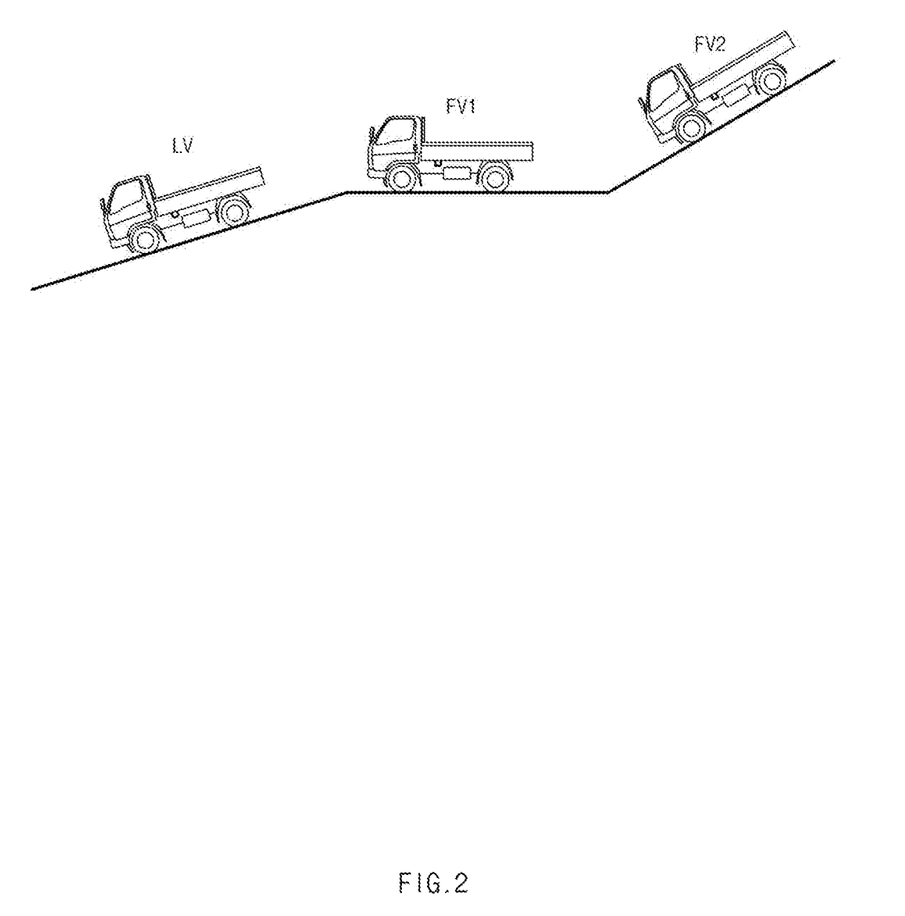
FIG. 2 is a drawing illustrating a situation where a platooning vehicle coasts down, according to an exemplary embodiment of the present disclosure.

Seeing the respective components, first of all, as shown in FIG. 2, the storage 10 may store various logics, algorithms, and programs, which are required in a process of determining whether there is a situation where each of following vehicles FV1 and FV2 is required to brake due to an increase in a speed of each of the following vehicles FV1 and FV2 when a platooning vehicle coasts down and operating a power unit (e.g., an engine or motor) of a leading vehicle LV to increase a speed of the leading vehicle LV. FIG. 2 is a drawing illustrating a situation where a platooning vehicle coasts down, according to an exemplary embodiment of the present disclosure.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), read-only memory (ROM), a programmable ROM (PROM), an electrically erasable PROM (EEPROM), a magnetic RAM (MRAM), a magnetic disk, and an optical disk.

The V2V communication device 20 may be a module which provides an interface for V2V communication and may communicate with vehicles which are during platooning to transmit and receive a variety of information. The V2V communication device 20 may receive target acceleration and current acceleration from each of the following vehicles FV1 and FV2. The V2V communication device 20 may directly receive information about a braking time from each of the following vehicles FV1 and FV2. In this case, the information about the braking time may refer to information about a time when braking should be performed to prevent a collision with a preceding vehicle (LV for FV1 or FV1 for FV2).

Herein, each of the following vehicles FV1 and FV2 may be equipped with a platooning device or a smart cruise control (SCC) system to calculate target acceleration for maintaining a separation distance from the preceding vehicle using the platooning device or the SCC system.

The sensor group 30 may include an accelerator position sensor (APS), a brake position sensor (BPS) 32, and an acceleration sensor 33. Herein, the APS 31 may be a sensor which measures a degree to which an accelerator pedal is pushed by a driver (hereinafter referred to as "APS value"). In this case, the APS value may be represented as a percentage (%) or an angle)(°. The BPS 32 may be a sensor which measures a degree to which a brake pedal is pressed by the driver (hereinafter referred to as "BPS value"). In this case, the BPS value may be expressed as a percentage (%) or an angle (°). The acceleration sensor 33 may measure acceleration.

The controller 40 may perform overall control such that the respective components normally perform their own functions. Such a controller 40 may be implemented in the form of hardware or software or in the form of a combination thereof. The controller 40 may be implemented as, but not limited to, a microprocessor.

To prevent a collision with the leading vehicle LV due to an increase in a speed of each of the following vehicles FV1 and FV2 when a platooning vehicle coasts down, the controller 40 may operate a power unit (e.g., an engine or motor) of the leading vehicle LV at a time when the following vehicles FV1 and FV2 are required to brake to increase a speed of the leading vehicle LV, thus preventing the following vehicles FV1 and FV2 from braking.

First Embodiment

A Case where a Leading Vehicle is a General Vehicle (Driven by a Driver)

When an APS value obtained using the APS 31 is "0" and when a BPS value obtained using the BPS 32 is "0", that is, when the leading vehicle coasts down, the controller 40 may predict a time when a following vehicle brakes, based on target acceleration of the following vehicle and current acceleration of the following vehicle, periodically obtained from the following vehicle via the V2V communication device 20. In this case, the controller 40 may determine a time when the following vehicle brakes, based on information about a braking time, obtained from the following vehicle via the V2V communication device 20. In other words, the controller 40 may receive a braking time from the following vehicle. Herein, the controller 40 may predict a time when the target acceleration of the following vehicle is less than the current acceleration of the following vehicle as a time when the following vehicle brakes.

The controller 40 may operate a power unit (e.g., an engine or motor) of the leading vehicle at a time when the following vehicle is predicted to brake to increase a speed of the leading vehicle, thus preventing the following vehicle from colliding with the leading vehicle from behind. In this case, the controller 40 may transmit a signal for requesting an operation to an engine controller or a motor controller to control such that the engine controller operates an engine or such that the motor controller operates a motor.

In addition, the controller 40 may increase a speed of the leading vehicle within a reference range, when the following conditions are met.

1) When there is no a preceding vehicle (a non-platooning vehicle) which is traveling on the same lane as the leading vehicle.

2) When a preceding vehicle (a non-platooning vehicle) which is traveling on the same lane as the leading vehicle is spaced apart from the leading vehicle at a certain distance.

3) When a preceding vehicle (a non-platooning vehicle) which is traveling on the same lane as the leading vehicle is greater in speed than a reference value compared with a speed of the leading vehicle.

4) When a current speed of the leading vehicle is less than a speed limit of the road.

Second Embodiment

Case where a Leading Vehicle is an Autonomous Vehicle

When a torque command value of an engine, obtained over a vehicle network, is "0" or a torque command value of a motor, obtained over a vehicle network, is "0" and a braking command value is "0", that is, when a platooning vehicle (the leading vehicle) coasts down, the controller 40 may predict a time when a following vehicle brakes, based on target acceleration of the following vehicle and current acceleration of the following vehicle, periodically obtained from the following vehicle via the V2V communication device 20. In this case, the controller 40 may determine a time when the following vehicle brakes, based on information about a braking time obtained from the following vehicle via the V2V communication device 20. In other words, the controller 40 may receive a braking time from the following vehicle. Herein, the following vehicle may predict its braking time based on target acceleration and current acceleration obtained using its platooning device.

The controller 40 may operate a power unit (e.g., an engine or motor) of the leading vehicle at a time when the following vehicle is predicted to brake to increase a speed of the leading vehicle, thus preventing the following vehicle from colliding with the leading vehicle from behind. In this case, the controller 40 may transmit a signal for requesting an operation to the engine controller or the motor controller to control such that the engine controller operates an engine or such that the motor controller operates a motor.

In addition, the controller 40 may increase a speed of the leading vehicle within a reference range, when the following conditions are met.

1) When there is no preceding vehicle (non-platooning vehicle) which is traveling on the same lane as the leading vehicle.

2) When a preceding vehicle (a non-platooning vehicle) which is traveling on the same lane as the leading vehicle is spaced apart from the leading vehicle at a certain distance.

3) When a preceding vehicle (a non-platooning vehicle) which is traveling on the same lane as the leading vehicle is greater in speed than a reference value compared with a speed of the leading vehicle.

4) When a current speed of the leading vehicle is less than a speed limit on the road.

The controller 40 may generate a platooning route including a start point, a merging point, and an arrival point for platooning.

Furthermore, the controller 40 may determine a weather environment on the platooning route. In other words, the controller 40 may receive weather forecast information from a control center or may obtain weather information using a result measured from a sensing device of the vehicle, and may determine a weather environment state and a road state (a road surface state) according to the weather environment state. For example, when it snows or rains on a platooning route and in a platooning time on the weather forecast information, the controller 40 may determines that a weather environment is in a bad condition.

Furthermore, the controller 40 may determine a platooning order based on the weather environment state. In other words, when the weather environment is in a normal condition, the controller 40 may consider at least one or more of a payload weight, a platooning route, fuel efficiency, or a braking force in a complex manner to determine a platooning order. For example, the controller 40 may select a vehicle with a weak braking force and bad fuel efficiency or a vehicle with many payloads as a leading vehicle and may locate a vehicle which has a strong braking force, has good fuel efficiency, and has small payloads behind the leading vehicle because it is able to quickly cope with emergency braking.

Furthermore, when the weather environment is in a bad condition due to snow or rain, the controller 40 may determine a platooning order based on a braking force. For example, when the weather environment is in a bad condition, a vehicle with the weakest braking force may be selected as a leading vehicle, a vehicle with a subsequently weak braking force may be determined as a first following vehicle immediately behind the leading vehicle, and an order of subsequent following vehicles may be determined as an order where a braking force is weak. In other words, because a braking distance is able to become long when a road surface is wet due to snow, rain, or the like, and, because braking is not performed at a proper time when a vehicle with a weak braking force is located behind, the vehicle with the weak braking force may collide with a preceding vehicle. Thus, when the weather environment is in a bad condition, the controller 40 may place a vehicle with a good braking force at the very rear.

The controller 40 may determine a platooning level. In this case, the platooning level may be determined using various methods considering various general conditions, for example, the number of platooning vehicles, payload weights of the platooning vehicles, a distance of a platooning route, and whether there is road construction. For example, the controller 40 may classify the platooning level as a first level for not performing platooning, a second level capable of controlling only a longitudinal inter-vehicle distance during platooning, or a third level capable of controlling a longitudinal inter-vehicle distance during platooning, a lateral inter-vehicle distance, and steering. In other words, there is a situation in which it is impossible to perform platooning (when the weather is very bad, or the like), the controller 40 may determine the platooning level as the first level. When it is possible to perform platooning, but it is possible to perform only longitudinal control using platooning following control because it is dangerous to perform lateral control, the controller 40 may determine the platooning level as the second level. When a weather environment is good, the controller 40 may determine the platooning level as the third level capable of performing all of platooning related control.

The controller 40 may determine a platooning level depending on a road level. For example, when the road level is a first level, the controller 40 may control a longitudinal inter-vehicle distance to 10 m. When the road level is a second level, the controller 40 may control the longitudinal inter-vehicle distance to 15 m. When the road level is a third level, the controller 40 may control the longitudinal inter-vehicle distance to 20 m. In this case, because increasing the road level means that a road state becomes worse because a weather state becomes worse, the controller 40 may control the longitudinal inter-vehicle distance to the longest distance (e.g., 20 m) because the road state is very bad (because there is a web road surface).

The controller 40 may determine a lane state or a road level based on weather information or road information. In this case, the controller 40 may recognize the lane state from image data of a camera (not shown).

The controller 40 may control platooning depending on the platooning level. In this case, the controlling of the platooning may refer to controlling a speed of the vehicle, a longitudinal inter-vehicle distance, a lateral inter-vehicle distance, or the like. When the platooning level is the first level, the controller 40 may fail to perform platooning. When the platooning level is the second level, the controller 40 may perform longitudinal control. When the platooning level is the third level, the controller 40 may perform longitudinal control, lateral control, steering control, or the like.

The controller 40 may control lateral and longitudinal inter-vehicle distances as a result of determining a lane state or a road level as well as the platooning level.

When the road level is good, the controller 40 may determine the longitudinal inter-vehicle distance as a first distance value (e.g., 10 m). When the road level is bad (when the road level is less than a second reference value), the controller 40 may determine the longitudinal inter-vehicle distance as a second distance value (e.g., 20 m) to which the first distance value is increased. In other words, when the road level is bad, the controller 40 may increase the longitudinal inter-vehicle distance to ensure safety upon emergency braking.

When the platooning level is the second level capable of performing only longitudinal control or when the road level is bad, the controller 40 may turn off a front view camera or a side view camera of the vehicle. In other words, when the platooning level is the second level and when the road level is bad, because the camera incorrectly recognize an object in front of the vehicle and has a bad influence on control, the controller 40 may turn off the camera.

Figure 3:
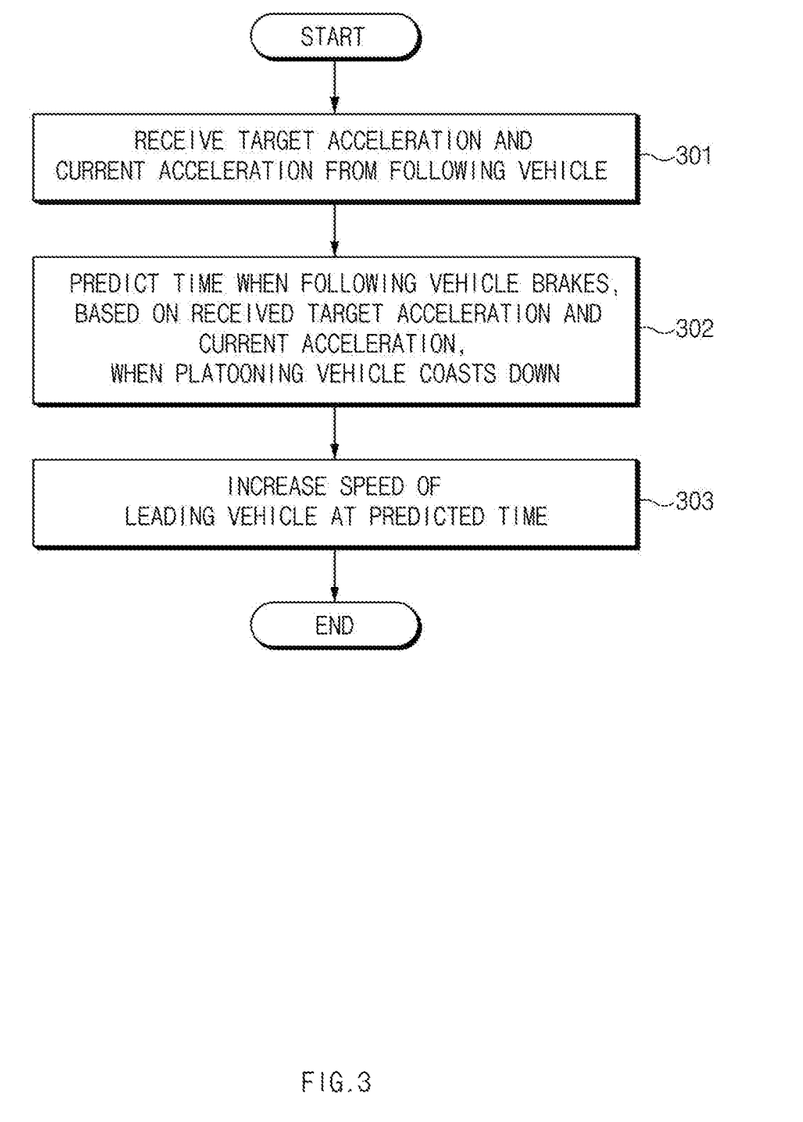
FIG. 3 is a flowchart illustrating a speed control method for a platooning vehicle according to an exemplary embodiment of the present disclosure.

FIG. 3 is a flowchart illustrating a speed control method for a platooning vehicle according to an exemplary embodiment of the present disclosure.

First of all, in operation 301, a V2V communication device 20 of FIG. 1 may receive target acceleration and current acceleration from a following vehicle. In this case, the V2V communication device 20 may receive target acceleration and current acceleration on a periodic basis from the following vehicle.

In operation 302, when a platooning vehicle (a leading vehicle) coasts down, a controller 40 of FIG. 1 may predict a time when the following vehicle brakes, based on the received target acceleration and the received current acceleration.

In operation 303, the controller 40 may increase a speed of the leading vehicle at the predicted time.

Figure 4:
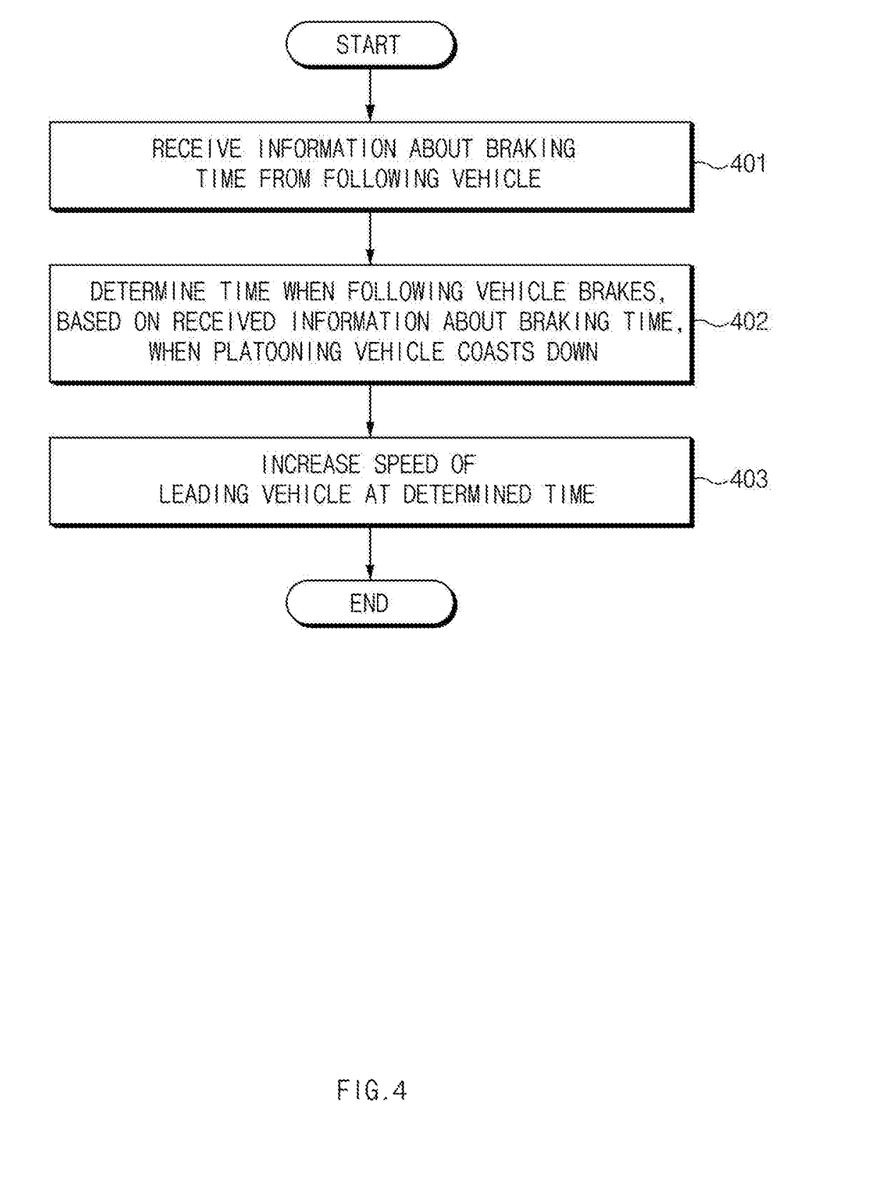
FIG. 4 is a flowchart illustrating a speed control method for a platooning vehicle according to another exemplary embodiment of the present disclosure.

FIG. 4 is a flowchart illustrating a speed control method for a platooning vehicle according to another exemplary embodiment of the present disclosure.

First of all, in operation 401, a V2V communication device 20 of FIG. 1 may receive information about a braking time from a following vehicle.

In operation 402, when a platooning vehicle (a leading vehicle) coasts down, a controller 40 of FIG. 1 may determine a time when the following vehicle brakes, based on the received information about the braking time.

In operation 403, the controller 40 may increase a speed of the leading vehicle at the determined time.

Figure 5:
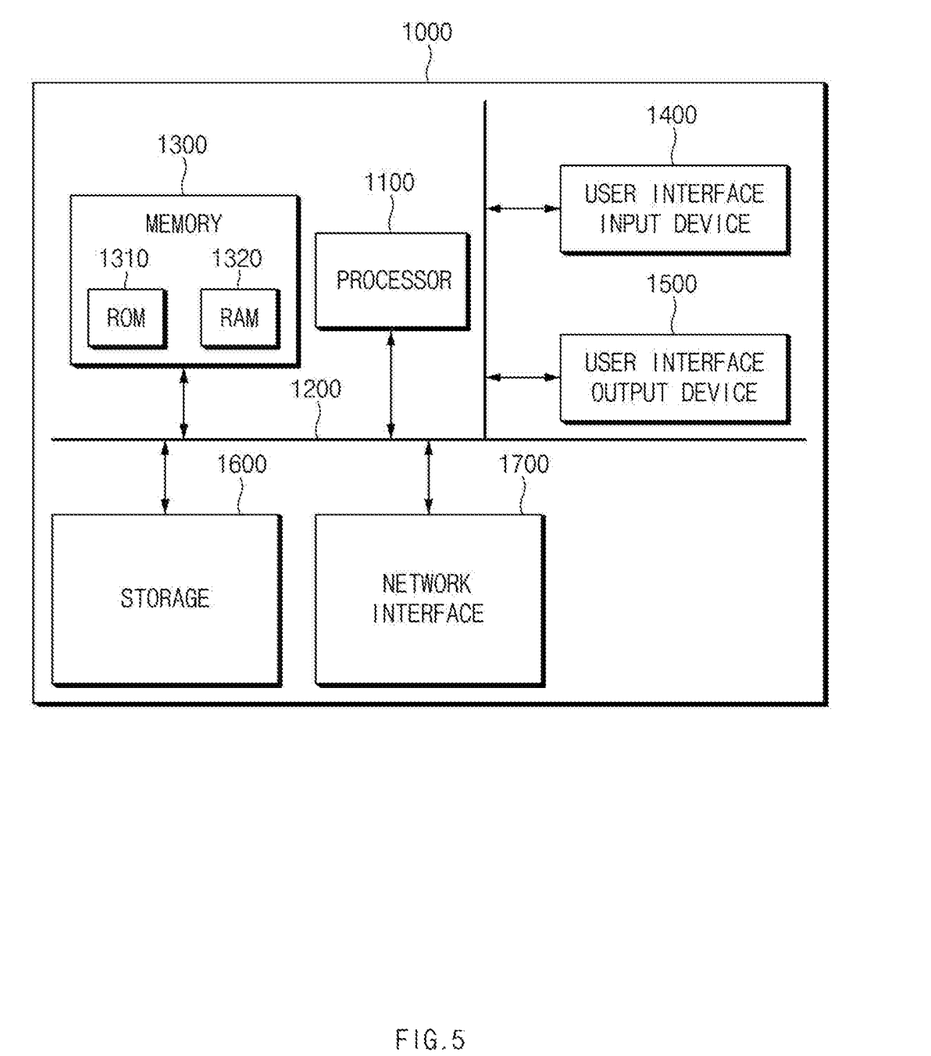
FIG. 5 is a block diagram illustrating a computing system for executing a speed control method for a platooning vehicle according to an exemplary embodiment of the present disclosure.

FIG. 5 is a block diagram illustrating a computing system for executing a speed control method for a platooning vehicle according to an exemplary embodiment of the present disclosure.

Referring to FIG. 5, the speed control method for the platooning vehicle according to an embodiment of the present disclosure may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The speed controller for the platooning vehicle and the method therefor may operate a power unit of a leading vehicle to increase a speed of the leading vehicle, when braking is required due to an increase in a speed of a following vehicle when the platooning vehicle coasts down, thus preventing the following vehicle from unnecessarily braking and enhancing platooning fuel efficiency.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A speed controller for a leading vehicle, the speed controller comprising:
a communication device configured to receive a target acceleration and a current acceleration from a following vehicle; and
a controller configured to predict a time when the following vehicle brakes based on the received target acceleration and the received current acceleration, when the leading vehicle coasts down, and to increase a speed of the leading vehicle at the predicted time.

2. The speed controller of claim 1, wherein the controller predicts a time when the target acceleration of the following vehicle is less than the current acceleration of the following vehicle as the time when the following vehicle brakes.

3. The speed controller of claim 1, further comprising a sensor group configured to measure an accelerator position sensor (APS) value and a brake position sensor (BPS) value.

4. The speed controller of claim 3, wherein the controller determines that the leading vehicle coasts down when the APS value is zero and the BPS value is zero.

5. The speed controller of claim 1, wherein the controller determines that the leading vehicle coasts down, when a torque command value of a power unit of the leading vehicle, the torque command value being obtained over a vehicle network, is zero and when a braking command value is zero.

6. The speed controller of claim 1, wherein the controller increases the speed of the leading vehicle within a reference range, when a preceding vehicle which is traveling on a same lane as the leading vehicle is spaced from the leading vehicle at a certain distance or when a speed of the preceding vehicle is greater than a reference value compared with the speed of the leading vehicle, in a state where a current speed of the leading vehicle is slower than a speed limit of a road.

7. A speed controller method for a platooning vehicle, the method comprising:
receiving a target acceleration and a current acceleration from a following vehicle;
predicting a time when the following vehicle brakes, based on the received target acceleration and the received current acceleration, when a leading vehicle coasts down; and
increasing a speed of the leading vehicle at the predicted time.

8. The method of claim 7, wherein the predicting a time when the following vehicle brakes includes predicting a time when the target acceleration of the following vehicle is less than the current acceleration of the following vehicle as the time when the following vehicle brakes.

9. The method of claim 7, further comprising obtaining an accelerator position sensor (APS) value and a brake position sensor (BPS) value.

10. The method of claim 9, wherein the predicting a time when the following vehicle brakes includes determining that the leading vehicle coasts down when the APS value is zero and the BPS value is zero.

11. The method of claim 7, wherein the predicting a time when the following vehicle brakes includes determining that the leading vehicle coasts down when a torque command value of a power unit of the leading vehicle is zero and when a braking command value is zero, the torque command value being obtained over a vehicle network.

12. The method of claim 7, wherein the increasing a speed of the leading vehicle includes increasing the speed of the leading vehicle within a reference range, when a preceding vehicle which is traveling on a same lane as the leading vehicle is spaced from the leading vehicle at a certain distance or when a speed of the preceding vehicle is greater than a reference value compared with the speed of the leading vehicle, in a state where a current speed of the leading vehicle is slower than a speed limit of a road.

13. A speed controller for a leading vehicle, the speed controller comprising:
 a communication device configured to receive information about a braking time from a following vehicle; and
 a controller configured to determine, when the leading vehicle coasts down, a time when the following vehicle brakes based on the received information about the braking time, and to increase a speed of the leading vehicle at the determined time.

14. The speed controller of claim 13, further comprising a sensor group configured to measure an accelerator position sensor (APS) value and a brake position sensor (BPS) value,
 wherein the controller determines that the leading vehicle coasts down when the APS value is zero and the BPS value is zero.

15. The speed controller of claim 13, wherein the controller determines that the leading vehicle coasts down when a torque command value of a power unit of the leading vehicle is zero and a braking command value is zero, the torque command value being obtained over a vehicle network.

16. The speed controller of claim 13, wherein the controller increases the speed of the leading vehicle within a reference range when a preceding vehicle which is traveling on a same lane as the leading vehicle is spaced from the leading vehicle at a certain distance or when a speed of the preceding vehicle is greater than a reference value compared with the speed of the leading vehicle, in a state where a current speed of the leading vehicle is slower than a speed limit of a road.

17. A speed control method for a platooning vehicle, the method comprising:
 receiving information about a braking time from a following vehicle;
 determining a time when the following vehicle brakes, based on the received information about the braking time when a leading vehicle coasts down; and
 increasing a speed of the leading vehicle at the determined time.

18. The method of claim 17, wherein the determining a time when the following vehicle brakes includes determining that the leading vehicle coasts down when the APS value is zero and the BPS value is zero.

19. The method of claim 17, wherein the determining a time when the following vehicle brakes includes determining that the leading vehicle coasts down when a torque command value of a power unit of the leading vehicle is zero and a braking command value is zero, the torque command value being obtained over a vehicle network.

20. The method of claim 17, wherein the increasing a speed of the leading vehicle includes increasing the speed of the leading vehicle within a reference range, when a preceding vehicle which is traveling on a same lane as the leading vehicle is spaced from the leading vehicle at a certain distance or when a speed of the preceding vehicle is greater than a reference value compared with the speed of the leading vehicle, in a state where a current speed of the leading vehicle is slower than a speed limit of a road.

* * * * *